(12) United States Patent
Casci et al.

(10) Patent No.: US 12,072,012 B1
(45) Date of Patent: Aug. 27, 2024

(54) TRANSMISSION WITH VENTED TERMINAL BLOCK

(71) Applicant: FORD GLOBAL TECHNOLOGIES, LLC, Dearborn, MI (US)

(72) Inventors: John P Casci, Canton, MI (US); Fan Wang, Novi, MI (US); Baoming Ge, Okemos, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/335,254

(22) Filed: Jun. 15, 2023

(51) Int. Cl.
| | |
|---|---|
| *F16H 57/02* | (2012.01) |
| *B60K 6/40* | (2007.10) |
| *B60K 6/405* | (2007.10) |
| *F16H 57/027* | (2012.01) |
| *H01R 9/24* | (2006.01) |
| *F16H 57/029* | (2012.01) |

(52) U.S. Cl.
CPC ........... *F16H 57/027* (2013.01); *B60K 6/405* (2013.01); *H01R 9/24* (2013.01); *B60Y 2200/92* (2013.01); *F16H 2057/02026* (2013.01); *F16H 2057/02034* (2013.01); *F16H 2057/02043* (2013.01); *F16H 57/029* (2013.01)

(58) Field of Classification Search
CPC ................. F16H 57/027; F16H 57/029; F16H 2057/02026; F16H 2057/02034; F16H 2057/02043; F16H 2057/0325; H01R 9/24; B60K 6/405; B60Y 2200/92
See application file for complete search history.

(56) References Cited

U.S. PATENT DOCUMENTS

| | | | |
|---|---|---|---|
| 7,594,800 B2 | 9/2009 | Teipen | |
| 7,836,675 B2 | 11/2010 | Corattiyil et al. | |
| 7,893,581 B2 * | 2/2011 | Miura | B60L 50/40 |
| | | | 310/71 |
| 8,821,332 B2 | 9/2014 | Kawamura et al. | |
| 10,644,418 B2 * | 5/2020 | Kawamura | H01R 13/516 |
| 11,223,305 B2 * | 1/2022 | Kishimoto | H02K 5/203 |
| 11,338,665 B1 * | 5/2022 | Casci | H05K 7/2089 |
| 11,359,716 B2 * | 6/2022 | Takahashi | F16H 61/0003 |
| 2014/0290429 A1 * | 10/2014 | Hasegawa | F16H 57/027 |
| | | | 74/606 A |
| 2020/0340573 A1 | 10/2020 | Matsumoto | |
| 2023/0406082 A1 * | 12/2023 | Inoue | F16H 37/0813 |

FOREIGN PATENT DOCUMENTS

JP 2001354040 A * 12/2001

* cited by examiner

*Primary Examiner* — Adam D Rogers
(74) *Attorney, Agent, or Firm* — Brooks Kushman P.C.

(57) ABSTRACT

A hybrid transmission has a housing with two chambers. One chamber contains electric motors and other transmission components that require a liquid lubricant and coolant such as automatic transmission fluid. The other chamber contains power electronics that must be isolated from the liquid lubricant/coolant. To reduce the number of breather tubes required, it is beneficial if air can move between the chambers. A terminal block cooperates with a separating wall between the two chambers to create a labyrinth seal between the chambers.

18 Claims, 5 Drawing Sheets

TRANSMISSION WITH VENTED TERMINAL BLOCK

TECHNICAL FIELD

The present invention relates to a hybrid transmission. More particularly, the disclosure relates to a terminal block installed between two sealed chambers of the transmission housing.

BACKGROUND

Automotive transmission typically utilize sealed housings. Temperature changes can increase or decrease the pressure of the air inside the housing relative to the outside pressure. Breathers are typically installed to allow air to flow bi-directionally between the housing and the ambient environment. The pathway of the breather tube must be carefully selected to preclude drawing contaminants from the ambient environment into the transmission housing.

SUMMARY

A hybrid transmission assembly includes a transmission housing, a terminal block, at least one motor, and a power electronics module. The transmission housing defines a first chamber and a second chamber separated by a wall defining an opening. The wall may define a plurality of grooves at least partially encircling the opening. The terminal block is fastened to the wall and has a plurality of electrically conductive terminals that extend through the opening. The terminal block and the wall cooperate to define a labyrinth seal that permits bi-directional exchange of air between the first and second chambers while preventing liquid from flowing from the first chamber to the second chamber. For example, the terminal block may have a number of ridges extending into the grooves to establish the labyrinth seal. The terminal block may define at least one vent hole fluidly connecting the labyrinth seal to a top surface of the terminal block. The terminal block may be fastened to the wall using bolts. The at least one motor, located in the first chamber, is electrically connected to the plurality of terminals. The power electronics module, located in the second chamber, is also electrically connected to the plurality of terminals and is configured to provide power to the at least one motor. A breather may extend between an exterior of the housing and one, and only one, of the first chamber and the second chamber.

A hybrid transmission assembly includes a transmission housing, a terminal block, and a breather. The transmission housing defines a first chamber and a second chamber, the first and second chambers separated by a wall defining an opening. The terminal block is fastened to the wall, for example by bolts, and has a plurality of electrically conductive terminals that extend through the opening. The terminal block and the wall are configured to permit bi-directional exchange of air between the first and second chambers while preventing liquid from flowing from the first chamber to the second chamber. The breather is configured to permit flow of air between an environment outside the housing and one of the first chamber and the second chamber. The wall may define a plurality of grooves at least partially encircling the opening and the terminal block may have a number of ridges extending into the grooves to establish a labyrinth seal. The terminal block may define at least one vent hole fluidly connecting the labyrinth seal to a top surface of the terminal block. Alternatively, the terminal block may include a first part which defines a plurality of grooves and a second part with a number of ridges extending into the grooves to establish a labyrinth seal. The hybrid transmission assembly may further include at least one motor in the first chamber electrically connected to the plurality of terminals. A power electronics module may be housed in the second chamber and be electrically connected to the plurality of terminals and configured to provide power to the at least one motor.

A terminal block includes a non-conductive body and a plurality of conductive terminals. The non-conductive body has a first surface and a second surface. The plurality of electrically conductive terminals extending through the body and protruding from the first surface and the second surface. The body has a series of ridges configured to cooperate with grooves of a mating part to define a labyrinth seal that permits bi-directional exchange of air between the first surface and the second surface while preventing liquid from flowing from first surface to the second surface. The non-conductive body may define at least one vent hole fluidly connecting the labyrinth seal to a top surface of the non-conductive body. The mating part may be a wall separating two chambers of a housing of a transmission assembly. Alternatively, the mating part and the non-conductive may both be made of plastic and may be joined together.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
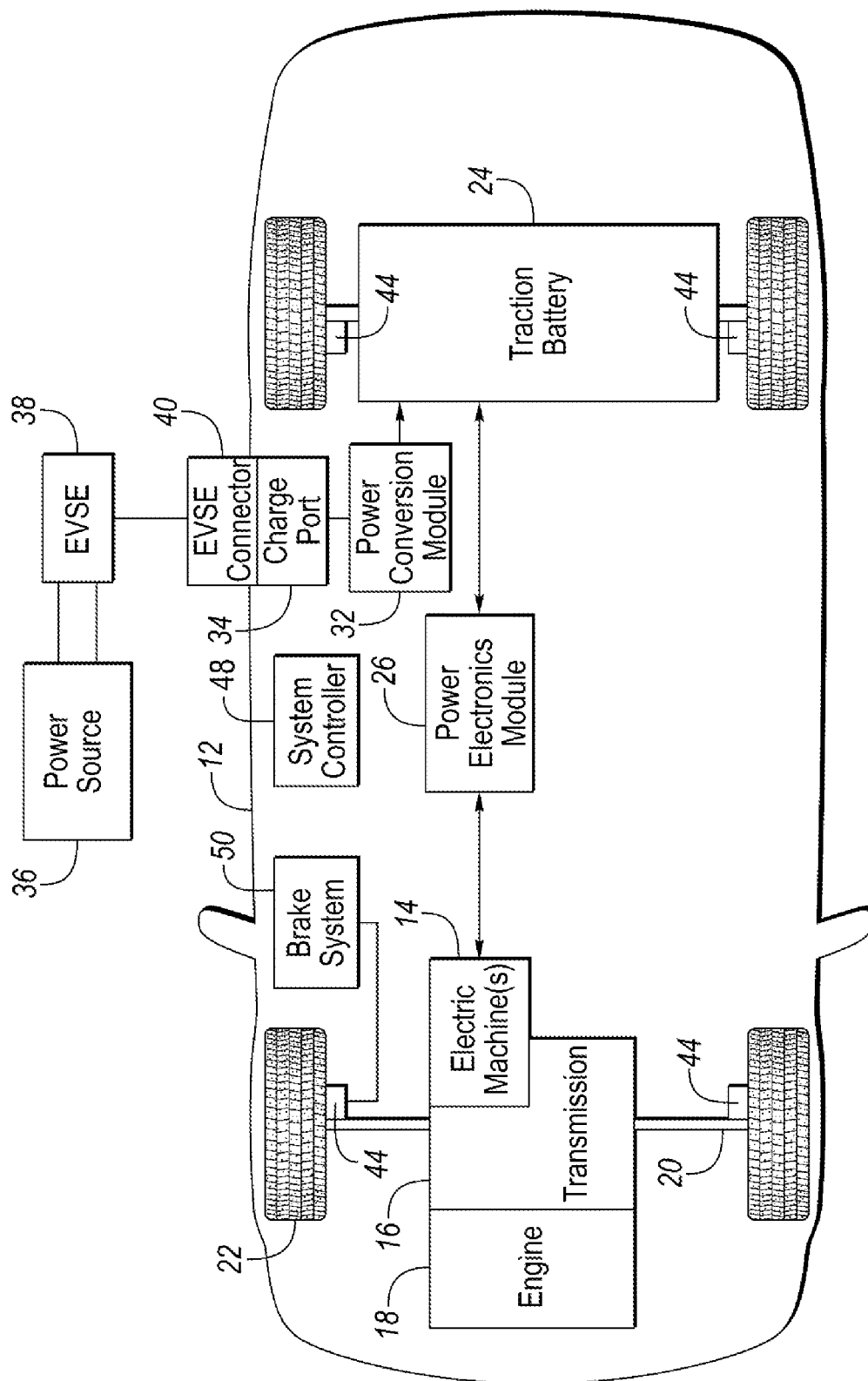
FIG. 1 illustrates a block diagram of an electric vehicle.

Referring now to FIG. 1, a block diagram of an exemplary electric vehicle ("EV") 12 is shown. In this example, EV 12 is a plug-in hybrid electric vehicle (PHEV). EV 12 includes one or more electric machines 14 ("e-machines") mechanically connected to a transmission 16. Electric machine 14 is capable of operating as a motor and as a generator. Transmission 16 is mechanically connected to an engine 18 and to a drive shaft 20 mechanically connected to wheels 22. Electric machine 14 can provide propulsion and slowing capability while engine 18 is turned on or off. Electric machine 14 acting as a generator can recover energy that may normally be lost as heat in a friction braking system. Electric machine 14 may reduce vehicle emissions by allowing engine 18 to operate at more efficient speeds and allowing EV 12 to be operated in electric mode with engine 18 off under certain conditions.

A traction battery 24 ("battery) stores energy that can be used by electric machine 14 for propelling EV 12. Battery 24 typically provides a high-voltage (HV) direct current (DC) output. Battery 24 is electrically connected to a power electronics module 26. Power electronics module 26 is electrically connected to electric machine 14 and provides the ability to bi-directionally transfer energy between battery 24 and the electric machine. For example, battery 24 may provide a DC voltage while electric machine 14 may require a three-phase alternating current (AC) voltage to function. Power electronics module 26 may convert the DC voltage to a three-phase AC voltage to operate electric machine 14. In a regenerative mode, power electronics module 26 may convert three-phase AC voltage from electric machine 14 acting as a generator to DC voltage compatible with battery 24.

Battery 24 is rechargeable by an external power source 36 (e.g., the grid). Electric vehicle supply equipment (EVSE) 38 is connected to external power source 36. EVSE 38 provides circuitry and controls to control and manage the transfer of energy between external power source 36 and EV 12. External power source 36 may provide DC or AC electric power to EVSE 38. EVSE 38 may have a charge connector 40 for plugging into a charge port 34 of EV 12. Charge port 34 may be any type of port configured to transfer power from EVSE 38 to EV 12. A power conversion module 32 of EV 12 may condition power supplied from EVSE 38 to provide the proper voltage and current levels to battery 24. Power conversion module 32 may interface with EVSE 38 to coordinate the delivery of power to battery 24. Alternatively, various components described as being electrically connected may transfer power using a wireless inductive coupling.

Wheel brakes 44 are provided for slowing and preventing motion of EV 12. Wheel brakes 44 are part of a brake system 50. Brake system 50 may include a controller to monitor and control wheel brakes 44 to achieve desired operation.

The various components discussed may have one or more associated controllers to control and monitor the operation of the components. The controllers can be microprocessor-based devices. The controllers may communicate via a serial bus (e.g., Controller Area Network (CAN)) or via discrete conductors. For example, a system controller 48 (i.e., a vehicle controller) is present to coordinate the operation of the various components.

As described, EV 12 is in this example is a PHEV having engine 18 and battery 24. In other embodiments, EV 12 is a battery electric vehicle (BEV). In a BEV configuration, EV 12 does not include an engine.

Figure 2:
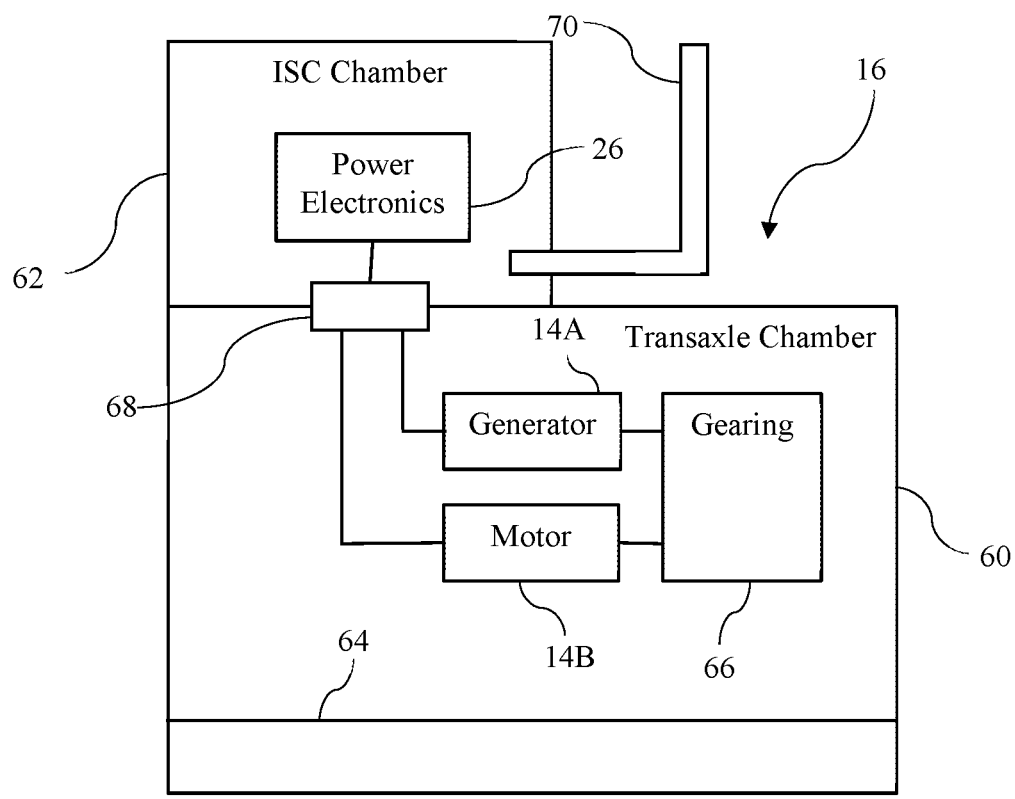
FIG. 2 illustrates a hybrid transmission assembly suitable for use in the vehicle of FIG. 1.

FIG. 2 schematically illustrates the structure of the transmission 16. The transmission housing includes two separate chambers: a transaxle chamber 60 that houses the motors and gearing and an Inverter System Controller (ISC) chamber 62 that houses the power electronics module 26. The transmission chamber 60 includes a sump filled with Automatic Transmission Fluid (ATF) or other suitable liquid lubricant 64. The gearing 66 routes power between the engine 18, a generator 14A, a motor 14B. and the drive shaft 20. The generator 14A and motor 14B may be permanent magnet synchronous motors or other suitable types of electric motors. The liquid lubricant 64 lubricates the gearing 66 and removes heat from the generator 14A, motor 14B, and gearing. The liquid lubricant may be distributed among these components using a pump or may be distributed by components splashing into the sump region. The two chambers are separated from one another by terminal block 68. The two separate chambers permit the power electronics module 26 to be isolated from the liquid lubricant 64. The air temperature in both chambers changes during operation. A breather 70 is used to maintain a pressure balance between the chambers and the ambient environment. When the internal air heats up, air escapes to the environment through the breather 70. When the internal air cools, air enters the chambers through the breather 70. The outlet of the breather is strategically located such that contaminants do not enter the housing through the breather.

Figure 3A:
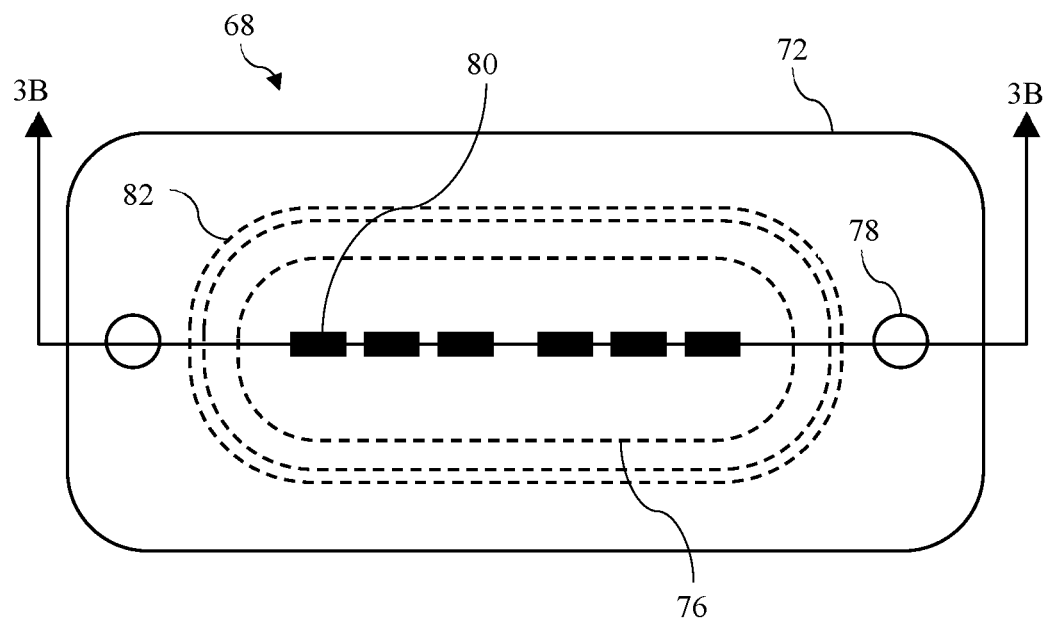
FIG. 3A is a top view of a first embodiment of a terminal block for use in the transmission of FIG. 2.
Figure 3B:
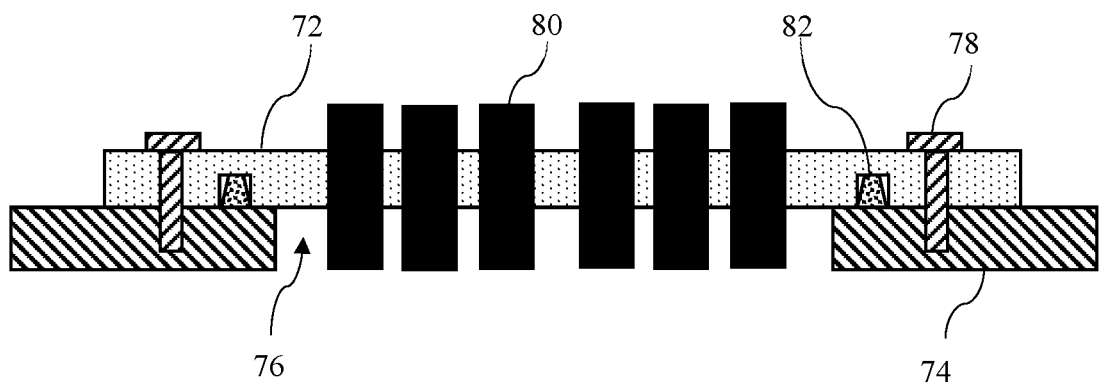
FIG. 3B is a cross-sectional view of the terminal block of FIG. 3A.

FIGS. 3A-3B illustrate a first embodiment of a terminal block 68. FIG. 3A is a top view while FIG. 3B is a cross-sectional view. Plastic body 72 is fastened to the separating wall 74 over an opening 76 in the separating wall. For example, the plastic body 72 may be fastened to the separating wall 74 by bolts 78. A set of six terminals 80 extend through the plastic body. Each terminal carries one phase of the three-phase stator current from the power electronics module 26 to either the generator 14A or the motor 14B. The number of terminals may vary based on the transmission kinematic architecture and the type of motor used. A seal 82 is installed between the plastic body and the separating wall 84 surrounding the opening 76. This seal prevents flow of either liquid lubricant or air between the two chambers. Since the two chambers are air sealed from one another, two breathers are required, one for each of the two chambers.

Figure 4A:
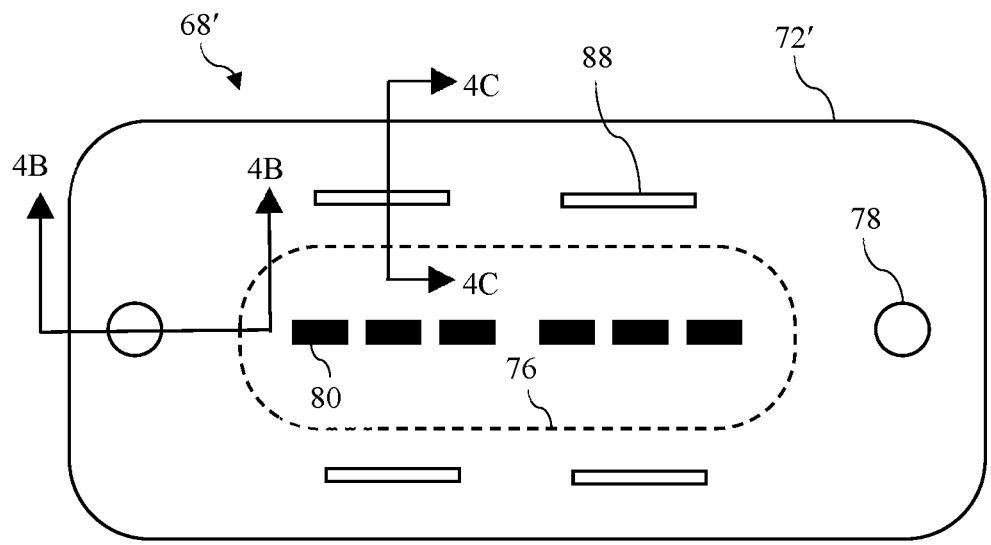
FIG. 4A is a top view of a second embodiment of a terminal block for use in the transmission of FIG. 2.
Figure 4B:
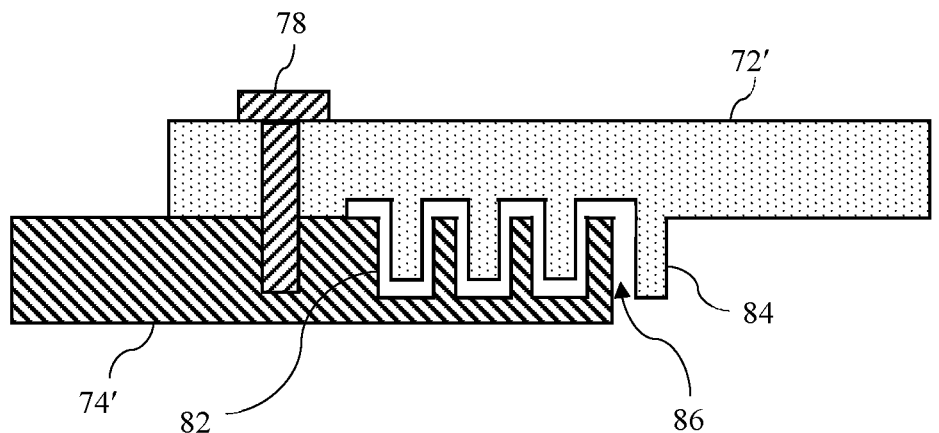
FIG. 4B is a first cross-sectional view of the terminal block of FIG. 4A.
Figure 4C:
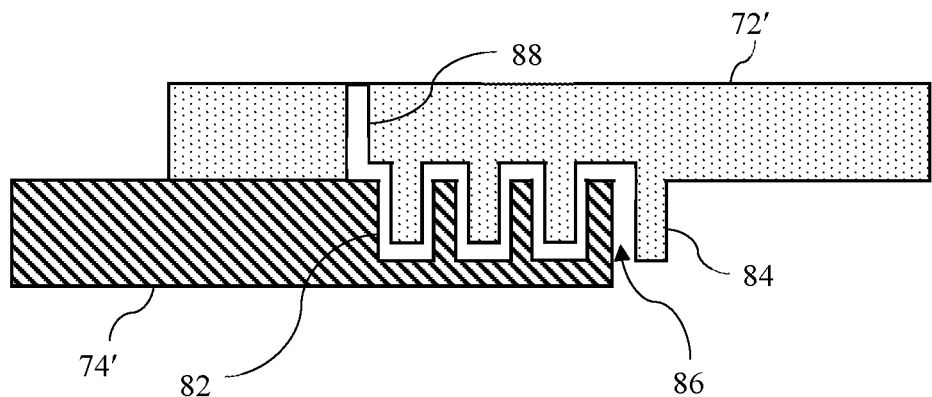
FIG. 4C is a second cross-sectional view of the terminal block of FIG. 4A.

FIGS. 4A-4C illustrate a second embodiment of a terminal block 68'. FIG. 4A is a top view while FIGS. 4B and 4C are cross-sectional views. Plastic body 72' is fastened to the separating wall 74' over an opening 76 in the separating wall. A set of six terminals 80 extend through the plastic body as in the first embodiment. As shown in FIGS. 4B and 4C, a number of grooves 82 are formed in the separating wall 74' surrounding the opening. A set of ridges 84 are formed in the plastic body 72' which fit into these grooves. The width and depth of the grooves and ridges, as well as the spacing between them, is selected such that the ridges extend into the grooves but the surfaces do not make contact. As a result, a circuitous path 86 is defined between the plastic body and the separating wall. (Contact at some circumferential locations may be acceptable.) Vents 88 at one or more circumferential locations define a passageway from the circuitous path 86 to the top surface of the plastic body 72'. The circuitous path 86 and vents 88 form a labyrinth seal which prevents flow of liquid lubricant between the two chambers but permits the exchange of air between the chambers. Since bi-directional airflow between the chambers is permitted, one breather located in either chamber is sufficient.

Figure 5A:
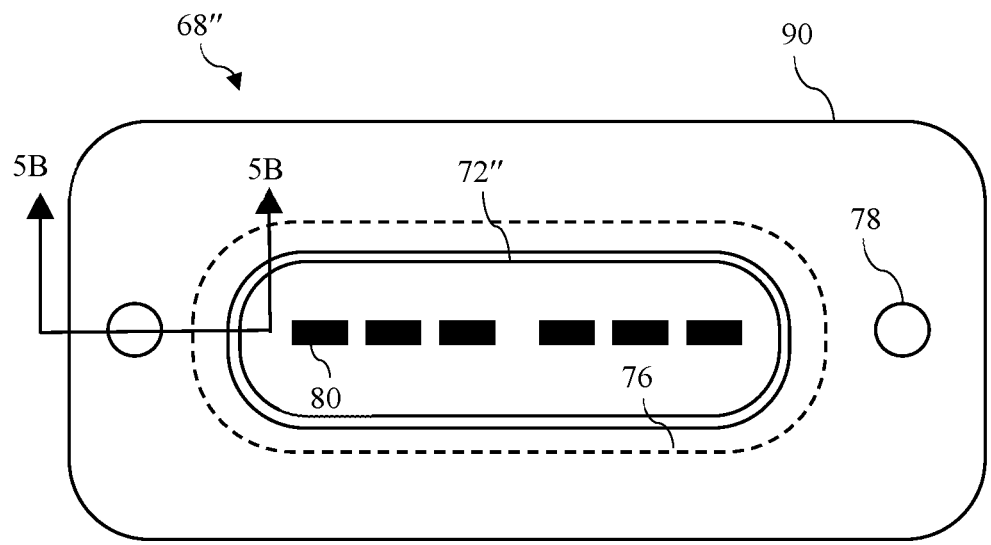
FIG. 5A is a top view of a third embodiment of a terminal block for use in the transmission of FIG. 2.
Figure 5B:
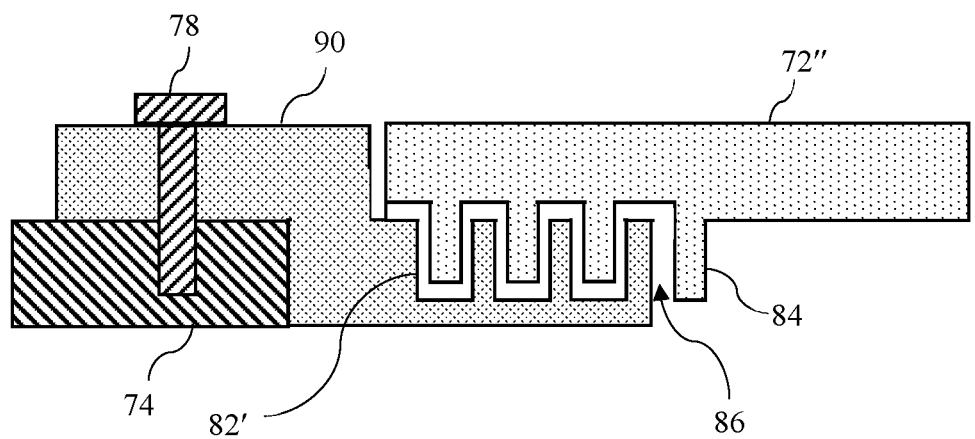
FIG. 5B is a cross-sectional view of the terminal block of FIG. 5A.

FIG. 5A-5B illustrate a third embodiment of a terminal block 68". FIG. 5A is a top view while FIG. 5B is a cross-sectional view. In this embodiment, the plastic body is made of two parts, 72" and 90. The labyrinth seal is formed between the two parts. First part 90 is fastened to the separating wall 74 over the opening 76. The set of six terminals 80 extend through the second part 72". As shown in FIG. 5B, a number of grooves 82' are formed in the first part 90. A set of ridges 84 are formed in the second part 72" which fit into these grooves. The width and depth of the grooves and ridges, as well as the spacing between them, is selected such that the ridges extend into the grooves but the surfaces do not make contact. The two parts 90 and 72" are fused together at several locations around the circumference to form a terminal block assembly. A circuitous path 86 is defined between two part at the circumferential locations that are not fused together. The labyrinth seal thus formed prevents flow of liquid lubricant between the two chambers but permits the flow of air between the chambers. Like the second embodiment, one breather located in either chamber is sufficient. The separating wall 74 does not need to be modified from the first embodiment.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A hybrid transmission assembly, comprising:
   a transmission housing defining a first chamber and a second chamber, the first and second chambers separated by a wall defining an opening;
   a terminal block fastened to the wall and having a plurality of electrically conductive terminals that extend through the opening, the terminal block and the wall cooperating to define a labyrinth seal that permits bi-directional exchange of air between the first and second chambers while preventing liquid from flowing from the first chamber to the second chamber;
   at least one motor in the first chamber electrically connected to the plurality of terminals; and
   a power electronics module in the second chamber electrically connected to the plurality of terminals and configured to provide power to the at least one motor.

2. The hybrid transmission assembly of claim 1 wherein the wall defines a plurality of grooves at least partially encircling the opening and the terminal block has a number of ridges extending into the grooves to establish the labyrinth seal.

3. The hybrid transmission assembly of claim 2 wherein the terminal block defines at least one vent hole fluidly connecting the labyrinth seal to a top surface of the terminal block.

4. The hybrid transmission assembly of claim 1 wherein the terminal block is fastened to the wall using bolts.

5. The hybrid transmission assembly of claim 1 further comprising a breather between an exterior of the housing and one of the first chamber and the second chamber.

6. The hybrid transmission assembly of claim 5 wherein no breather directly connects a second one of the first chamber and the second chamber to the exterior.

7. A hybrid transmission assembly, comprising:
   a transmission housing defining a first chamber and a second chamber, the first and second chambers separated by a wall defining an opening;
   a terminal block fastened to the wall and having a plurality of electrically conductive terminals that extend through the opening, the terminal block and the wall configured to permit bi-directional exchange of air between the first and second chambers while preventing liquid from flowing from the first chamber to the second chamber; and
   a breather configured to permit flow of air between an environment outside the housing and one of the first chamber and the second chamber.

8. The hybrid transmission assembly of claim 7 wherein the wall defines a plurality of grooves at least partially encircling the opening and the terminal block has a number of ridges extending into the grooves to establish a labyrinth seal.

9. The hybrid transmission assembly of claim 8 wherein the terminal block defines at least one vent hole fluidly connecting the labyrinth seal to a top surface of the terminal block.

10. The hybrid transmission assembly of claim 7 wherein the terminal block comprises a first part which defines a plurality of grooves and a second part with a number of ridges extending into the grooves to establish a labyrinth seal.

11. The hybrid transmission assembly of claim 7 wherein the terminal block is fastened to the wall using bolts.

12. The hybrid transmission assembly of claim 7 further comprising at least one motor in the first chamber electrically connected to the plurality of terminals.

13. The hybrid transmission assembly of claim 12 further comprising a power electronics module in the second chamber electrically connected to the plurality of terminals and configured to provide power to the at least one motor.

14. A terminal block, comprising:
   a non-conductive body having a first surface and a second surface; and
   a plurality of electrically conductive terminals extending through the body and protruding from the first surface and the second surface;
   wherein the body has a series of ridges configured to cooperate with grooves of a mating part to define a labyrinth seal that permits bi-directional exchange of air between the first surface and the second surface while preventing liquid from flowing from the first surface to the second surface.

15. The terminal block of claim 14 wherein the non-conductive body defines at least one vent hole fluidly connecting the labyrinth seal to a top surface of the non-conductive body.

16. The terminal block of claim 14 wherein the mating part is a wall separating two chambers of a housing of a transmission assembly.

17. The terminal block of claim 14 further comprising the mating part, wherein the mating part is joined to the non-conductive body and both the non-conductive body and the mating part are made of plastic.

18. The terminal block of claim 14 wherein the plurality of electrically conductive terminals includes six terminals.

* * * * *